United States Patent
Takeuchi et al.

(10) Patent No.: US 10,587,159 B2
(45) Date of Patent: Mar. 10, 2020

(54) ROTOR AND RELUCTANCE MOTOR

(71) Applicants: Kabushiki Kaisha Toshiba, Minato-ku (JP); Toshiba Infrastructure Systems & Solutions Corporation, Kawasaki-shi (JP)

(72) Inventors: Katsutoku Takeuchi, Kokubunji (JP); Makoto Matsushita, Fuchu (JP); Norio Takahashi, Yokohama (JP); Daisuke Misu, Tama (JP); Toshio Hasebe, Hachioji (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/298,095

(22) Filed: Mar. 11, 2019

(65) Prior Publication Data
US 2019/0207441 A1    Jul. 4, 2019

Related U.S. Application Data

(63) Continuation of application No. PCT/JP2017/028970, filed on Aug. 9, 2017.

(30) Foreign Application Priority Data

Sep. 16, 2016 (JP) ................ 2016-182354

(51) Int. Cl.
*H02K 1/24* (2006.01)
*H02K 1/22* (2006.01)
(Continued)

(52) U.S. Cl.
CPC ........... *H02K 1/246* (2013.01); *H02K 1/22* (2013.01); *H02K 1/2766* (2013.01); *H02K 19/10* (2013.01)

(58) Field of Classification Search
CPC ............... H02K 1/246; H02K 1/2766
(Continued)

(56) References Cited

U.S. PATENT DOCUMENTS

| 6,300,703 B1 | 10/2001 | Kawano et al. | |
| 2002/0070620 A1* | 6/2002 | Naito | H02K 1/2766 310/156.56 |
| 2014/0217848 A1* | 8/2014 | Jurkovic | H02K 1/2766 310/156.53 |

FOREIGN PATENT DOCUMENTS

| EP | 3 288 160 A1 | 2/2018 |
| JP | 10-257700 | 9/1998 |

(Continued)

OTHER PUBLICATIONS

International Search Report dated Oct. 31, 2017 in PCT/JP2017/028970, filed Aug. 9, 2017 (with English Transaction).

*Primary Examiner* — Hanh N Nguyen
(74) *Attorney, Agent, or Firm* — Oblon, McClelland, Maier & Neustadt, L.L.P.

(57) ABSTRACT

According to one embodiment, a rotor includes a shaft and a rotor core. A plurality of flux barriers are formed at the rotor core. The flux barrier has a plurality of bridges, and one or more barrier regions. When a width of the bridge of a first flux barrier is defined as $w_a$, a width of the bridge of a second flux barrier is defined as $w_b$, a value obtained by dividing a radius of a smallest circle that is tangent to a central line of the first flux barrier by an outer radius of the rotor core is defined as a, and a value obtained by dividing a radius of a smallest circle that is tangent to a central line of the second flux barrier by the outer radius of the rotor core is defined as b, and when $f(x)=(1-x^2)^{(3/2)}$ and $g(x)=(1-x^3)$, a relationship of $f(b)/f(a) \leq w_b/w_a \leq g(b)/g(a)$ is satisfied.

5 Claims, 9 Drawing Sheets

(51) Int. Cl.
*H02K 19/10* (2006.01)
*H02K 1/27* (2006.01)

(58) Field of Classification Search
USPC .......................... 310/156.57, 156.83, 156.45
See application file for complete search history.

(56) References Cited

FOREIGN PATENT DOCUMENTS

| | | |
|---|---|---|
| JP | 2001-258222 | 9/2001 |
| JP | 2002-10594 | 1/2002 |
| JP | 2006-325297 | 11/2006 |
| JP | 4367375 | 11/2009 |
| JP | 2009-296685 | 12/2009 |
| WO | WO 2016/171021 A1 | 10/2016 |

\* cited by examiner

ROTOR AND RELUCTANCE MOTOR

CROSS-REFERENCE TO RELATED APPLICATIONS

This application is a continuation patent application of International Application No. PCT/JP2017/028970, filed Aug. 9, 2017, which claims priority to Japanese patent application No. 2016-182354, filed Sep. 16, 2016. Both applications are hereby expressly incorporated by reference herein in their entireties.

FIELD

Embodiments described herein relate generally to a rotor and a reluctance motor.

BACKGROUND

Reluctance motors in which a flux barrier acting as a magnetic barrier is formed in a rotor are known. In the related art, when a width of a bridge adjacent to a flux barrier is increased, a magnetic flux may leak out of the bridge, and flow in a direction in which an original magnetic flux is to be obstructed (a direction of a d axis). Thus, there is a problem that the saliency is reduced, and that the motor performance such as an output density, efficiency, or a power factor is reduced. In contrast, when the width of the bridge is reduced, the motor performance is improved, but a mechanical strength may be reduced.

The problem to be solved by the present invention is to provide a rotor and a reluctance motor capable of improving motor performance while maintaining mechanical strength.

DETAILED DESCRIPTION

According to one embodiment, a rotor includes: a shaft configured to rotate about the central axis; and a rotor core fixed to the shaft. The rotor core has a plurality of flux barriers which are formed side by side in a radial direction of the rotor core and each of which ranges from a certain portion to another portion of an outer circumferential surface of the rotor core. A plurality of bridges are formed at each of the flux barriers. Further, one or more barrier regions that have a lower permeability than a portion other than each of the flux barriers in the rotor core between the plurality of bridges are formed at each of the flux barriers. When an arithmetic mean value between a minimum and a maximum of a width of a first flux barrier, which is close to the central axis, of at least two of the flux barriers is defined as $w_a$, an arithmetic mean value between a minimum and a maximum of a width of a second flux barrier, which is distant from the central axis, of the at least two flux barriers is defined as $w_b$, a value obtained by dividing a radius of a smallest circle whose center is the central axis and which is tangent to a central line of the first flux barrier by an outer radius of the rotor core is defined as a, and a value obtained by dividing a radius of a smallest circle whose center is the central axis and which is tangent to a central line of the second flux barrier by the outer radius of the rotor core is defined as b, and when $f(x)=(1-x^2)^{(3/2)}$ and $g(x)=(1-x^3)$, a relationship of $f(b)/f(a) \leq w_b/w_a \leq g(b)/g(a)$ is satisfied where $a<b$.

Hereinafter, a rotor and a reluctance motor of an embodiment will be described with reference to the drawings.

First Embodiment

Figure 1:
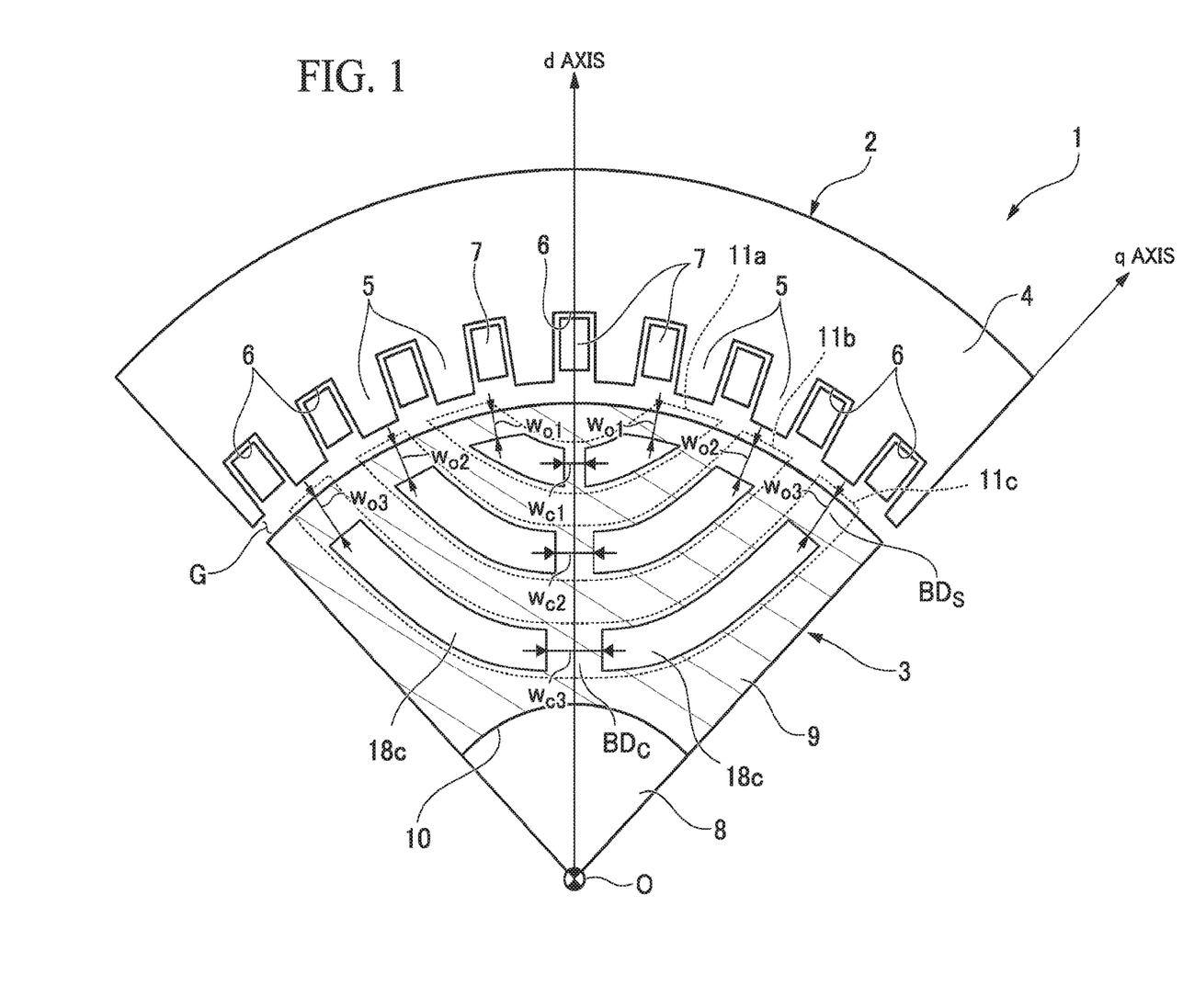
FIG. 1 is a sectional view that shows a constitution equivalent to one pole of a reluctance motor in a first embodiment and that is orthogonal to a rotating shaft.

FIG. 1 is a sectional view that shows a constitution equivalent to one pole of a reluctance motor 1 in a first embodiment and that is orthogonal to a rotating shaft 8. In FIG. 1, one pole of the reluctance motor 1, that is, only a circumferential angle region of a quarter of a circumference is illustrated. The rotating shaft 8 may be, for example, a shaft that is axially supported to be rotatable, extends in an axial direction centering on the rotating shaft 8, and is rotated about the rotating shaft 8.

As illustrated in FIG. 1, the reluctance motor 1 includes a stator 2 in an approximately cylindrical shape, and a rotor 3 that is provided inside the stator 2 in a radial direction and is provided to be rotatable relative to the stator 2. The stator 2 and the rotor 3 are disposed with central axes thereof located on a common axis. Hereinafter, the aforementioned common axis is referred to as a central axis O. A direction orthogonal to the central axis O is referred to as a radial direction, and a direction going around the central axis O is referred to as a circumferential direction.

The stator 2 has a stator core 4 in an approximately cylindrical shape. The stator core 4 can be formed by stacking a plurality of electromagnetic steel sheets or by pressing a soft magnetic powder under pressure. A plurality of teeth 5, which protrude toward the central axis O and are arranged at regular intervals in the circumferential direction, are integrally formed on an inner circumferential surface of the stator core 4. The teeth 5 are formed in an approximately rectangular cross section. Respective slots 6 are formed between neighboring teeth 5. Armature windings 7 are wound around the teeth 5 via these slots 6.

The stator core 4 may have an insulator with insulation properties mounted thereon, or be coated with an insulating film on an entire outer surface thereof (neither shown). The armature windings 7 are wound around the teeth 5 with the insulator or the insulating film therebetween.

The rotor 3 includes the rotating shaft 8 that extends along the central axis O, and a rotor core 9 that is externally fitted to the rotating shaft 8 and has an approximately cylindrical shape. The rotor core 9 can be formed by stacking a plurality of electromagnetic steel sheets or pressing a soft magnetic powder under pressure. An outer diameter of the rotor core 9 is set such that a predetermined air gap G is formed between the teeth 5 that face each other in the radial direction.

Further, a through hole 10 drilled along the central axis O is formed in the center of the rotor core 9 in the radial direction. The rotating shaft 8 is, for example, press-fitted into the through hole 10. Thus, the rotating shaft 8 and the rotor core 9 are rotated together.

Furthermore, a plurality of flux barriers 11 are formed side by side within a circumferential angle region of each quarter circumference in the rotor core 9 to pass through one diameter that crosses the rotating shaft 8 of the rotor core 9. That is, these flux barriers 11 are formed between a plurality of magnetic paths through which a magnetic flux produced by the stator 2 passes from a certain portion to another portion on an outer circumferential surface of the rotor core 9, and separate the magnetic paths. In the present embodiment, three flux barriers 11a, 11b and 11c are formed. In FIG. 1, reference signs of the barrier regions in the flux barriers 11a, 11b and 11c are given as 18a, 18b and 18c.

Each of the aforementioned flux barriers 11 has a plurality of barrier regions 18 (e.g., two barrier regions side by side in the present embodiment), which are distributed in an approximately hyperbolic shape. A direction in which a flow of magnetic flux is not obstructed by the barrier regions 18 in the rotor core 9 is defined as a q axis. That is, a positive magnetic potential (e.g., approaches the N pole of a magnet) is given to a certain circumferential angle position A of an outer circumferential surface of the rotor, whereas a negative magnetic potential (e.g., approaches the S pole of a magnet) is given to a circumferential angle position B shifted by one pole (90 degrees in the case of the present embodiment), so that a direction directed to the position A from the central axis O when most magnetic flux flows in a case where the position A is shifted in the circumferential direction is defined as a q axis.

On the other hand, a direction in which a flow of magnetic flux is obstructed by the barrier regions 18, that is, a direction that is magnetically orthogonal to the q axis is defined as a d axis. In the present embodiment, a direction parallel to a direction in which two portions of the rotor core separated as regions close to and distant from the central axis O by the flux barriers 11 face each other is the d axis. Further, in a case where the flux barriers 11 are formed in multiple layers (three layers in the present embodiment), a direction in which the layers overlap one another is the d axis. The flux barriers 11 are not limited to three layers, and may be formed in one or two layers, or in four or more layers. The number of barrier regions 18 in each of the flux barriers 11 is not limited to two, and may be one or three or more.

Each of the barrier regions 18 is formed in the shape of an approximately circular-arc cross section that is curved in a convex shape from an outer circumferential side toward the central axis O on an inner side in the radial direction to follow the q axis on at least an outer circumferential side and so as for the middle in the circumferential direction to be located at an innermost side in the radial direction. The shape of each of barrier regions 18 is not limited to a circular arc, and may be a convex shape such as a U shape. In the present embodiment, six barrier regions 18 having an approximately circular-arc shape are formed in each of the circumferential angle regions of the rotor core 9. The inside of the barrier region 18 may be filled with a non-magnetic material such as a resin, or be a cavity. Further, a conductor such as aluminum or copper may be inserted into the barrier region 18. For example, in a case where the reluctance motor 1 in the present embodiment is used as a synchronous motor, the conductor inserted into the barrier region 18 relieves a pulsation, and thus hunting caused by a sudden change in load can be inhibited. That is, since the conductor is inserted into the barrier region 18, the same anti-hunting effect as when a damper winding is provided in the rotor 3 can be obtained. Further, it is generally difficult to start a synchronous motor in a state where rotation of the rotor 3 is stopped. On the other hand, in the present embodiment, since the conductor is inserted into the barrier region 18, the conductor operates similarly to a damping winding. Thereby, the reluctance motor 1 is started as an induction motor, and energizes the rotor 3 side after accelerating to the vicinity of a synchronous speed. Thereby, when driven using power supplied from a commercial power supply, the reluctance motor 1 can self-start.

In the magnetic flux flowing from the stator 2 to the rotor 3, the magnetic flux in the direction of the q axis can be approximately represented by a contour line of Equation (1) that expresses a hyperbola on any one plane (r-θ) of cylindrical coordinates (r-θ-z) when the central axis O is set to a direction of a z axis. That is, a flow line of magnetic flux of the q axis is approximately aligned with loci of r and θ that satisfy a relationship where f(r, θ) becomes a constant value. However, in Equation (1), p indicates the number of poles of the reluctance motor 1. For this reason, a shape of each barrier region 18 may also be formed to roughly follow the contour line of the hyperbola shown by Equation (1).

[Equation 1]

$$f(r, \theta) = r^{\frac{p}{2}} \cos\left(\frac{p}{2}\theta\right) \qquad (1)$$

In view of a centrifugal force occurring at the rotor core 9, the plurality of barrier regions 18 are provided at positions spaced apart from an outer circumference of the rotor core 9 by a predetermined distance $w_O$ at end portions adjacent to outer circumferential sides of the flux barriers 11. For example, the barrier regions 18a of the flux barrier 11a closest to the outer circumferential side in the radial direction are provided at positions spaced apart from the outer circumference of the rotor core 9 by a predetermined distance $w_{O1}$. Further, the barrier regions 18c of the flux barrier 11c closest to the rotating shaft 8 in the radial direction are provided at positions spaced apart from the outer circumference of the rotor core 9 by a predetermined distance $w_{O3}$. Further, the barrier regions 18b of the flux barrier 11b located between the flux barriers 11a and 11c in the radial direction are provided at positions spaced apart from the outer circumference of the rotor core 9 by a predetermined distance $w_{O2}$. These distances preferably have a relationship of $w_{O1} < w_{O2} < w_{O3}$, but some or all thereof may be the same. In this way, the barrier region 18 is separated from the outer circumference by a certain degree of width (thickness), and thereby mechanical strength of the rotor core 9 located between the outer circumference of the rotor core 9 and the barrier region 18 can be raised. A plurality of bridges including outer circumferential bridges $BD_S$ are formed at the rotor core 9. The outer circumferential bridges $BD_S$ are bridges that form parts of the outer circumferential surface of the rotor core 9 at opposite ends of each flux barrier 11 in a longitudinal direction of each flux barrier 11. The outer circumferential bridges $BD_S$ function to couple (connect) the rotor core 9 to the rotor core 9 across each flux barrier 11.

A width $w_O$ of each of the outer circumferential bridges $BD_S$ provided at the opposite ends of each flux barrier 11 is a thickness with respect to a direction directed from an outer circumferential side of the rotor 3 toward the rotating shaft 8. For example, the width of each outer circumferential bridge $BD_S$ is set to a distance between the outer circumferential surface of the rotor core 9 and an interface of each barrier region 18 on the outer circumferential side in a longitudinal direction of each barrier region 18. For example, in a case where curved lines or broken lines that represent the outer circumferential surface of the rotor core 9 and the interface of each barrier region 18 on the outer circumferential side in the longitudinal direction of each barrier region 18 are not parallel to each other, the width of each outer circumferential bridge $BD_S$ is defined as an arithmetic mean value between a minimum distance and a maximum distance between the curved lines or the broken lines. For example, an arbitrary reference point is set on the curved line or the broken line that indicates the outer circumferential surface of the rotor core 9. A straight line indicating a distance from the reference point to the curved line or the broken line, which indicates the interface of the barrier region 18 on the outer circumferential side in the longitudinal direction of each barrier region 18, which is shortest is derived. Afterward, a plurality of straight lines indicating the shortest distance to the interface while shifting the reference point are derived on the curved line or the broken line that indicates the outer circumferential surface. An average of lengths of the plurality of straight lines derived in this way is defined as the width $w_O$ of each outer circumferential bridge $BD_S$. That is, the width $w_O$ of each outer circumferential bridge $BD_S$ becomes a distance between surfaces facing each other.

Further, in a case where the plurality of barrier regions 18 are formed at an interval in extending directions thereof at a midpoint between opposite ends of each flux barrier 11 in an extending direction of each flux barrier 11 (e.g., a position closest to the rotating shaft 8 in the radial direction), the barrier regions 18 are formed at intervals apart of a predetermined distance $w_C$. For example, the barrier regions 18 in the flux barrier 11a are provided at positions spaced apart from each other by a predetermined distance $w_{c1}$. The barrier regions 18 in the flux barrier 11b are provided at positions spaced apart from each other by a predetermined distance $w_{c2}$. The barrier regions 18 in the flux barrier 11c are provided at positions spaced apart from each other by a predetermined distance $w_{c3}$. These distances preferably have a relationship of $w_{c1} < w_{c2} < w_{c3}$, but they may be partly or all the same. Thus, the mechanical strength of the rotor core 9 located between the plurality of barrier regions 18 can be raised. In the following description, the rotor core 9 located between the barrier regions 18 at the midpoint between the opposite ends of each flux barrier 11 is referred to as a "center bridge $BD_C$." The center bridge $BD_C$ is an example of an "inner bridge."

The paired barrier regions 18 between which the center bridge $BD_C$ is sandwiched have approximately the same shapes as each other. Like the outer circumferential bridges $BD_S$, the center bridge $BD_C$ functions to couple (connect) the rotor core 9 to the rotor core 9 across each flux barrier 11. A width we of the center bridge $BD_C$ is a distance between interfaces close to the center bridge $BD_C$ in the paired barrier regions 18 between which the center bridge $BD_C$ is sandwiched (e.g., interfaces close to the center bridge $BD_C$ that is symmetrical with respect to the d axis in FIG. 1). For example, in a case where curved lines or broken lines that represent the interfaces close to the center bridge $BD_C$ in the paired barrier regions 18 are not parallel to each other, like the method of defining the width $w_O$ of each outer circumferential bridge $BD_S$, the widths $w_C$ of the center bridge $BD_C$ is defined as an arithmetic mean value between a minimum value and a maximum value of a distance between the curved lines or the broken lines.

Since the outer circumferential bridges $BD_S$ and the center bridge $BD_C$ are formed, even in a state where the barrier regions 18 are formed, the rotor core 9 is united as one member without the rotor core 9 being separated by the barrier regions 18 at the opposite ends and the midpoint of each flux barrier 11.

Figure 2:
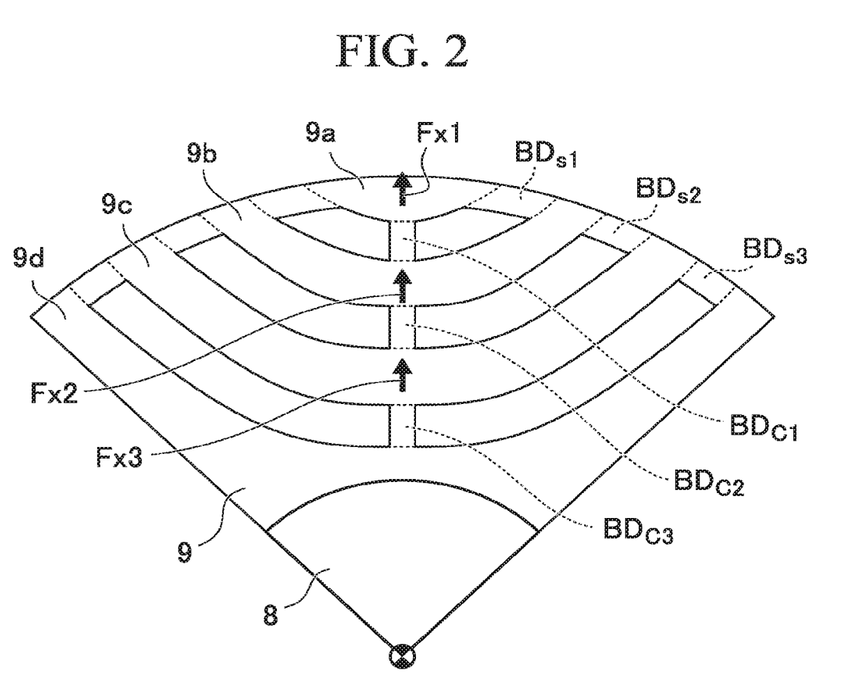
FIG. 2 is a schematic diagram showing a situation where a centrifugal force occurs in a rotor.

FIG. 2 is a schematic diagram showing a situation where a centrifugal force occurs in a rotor 3. In the case of a constitution of the rotor 3 illustrated in FIG. 1, the rotor core 9 is divided into four core portions 9a, 9b, 9c and 9d, which are connected by the bridges. The rotor 3 is rotated, and a centrifugal force Fx1 is thereby applied to the core portion 9a. Correspondingly, stress caused by the centrifugal force Fx1 occurs at outer circumferential bridges $BD_{S1}$ and a center bridge $BD_{C1}$. For example, the stress is shear stress or tensile stress.

Further, a centrifugal force Fx2 is applied to the core portions 9b. Correspondingly, in addition to the centrifugal force Fx2 occurring at the core portions 9b, the centrifugal force Fx1 occurring at the core portion 9a also acts on outer circumferential bridges $BD_{S2}$ and a center bridge $BD_{C2}$, and thus stress greater than that occurring at the outer circumferential bridges $BD_{S1}$ and the center bridge $BD_{C1}$ occurs. Similarly, in addition to a centrifugal force Fx3 occurring at the core portions 9c, the centrifugal forces Fx1 and Fx2 also act on outer circumferential bridges $BD_{S3}$ and a center bridge $BD_{C3}$, and thus stress greater than that occurring at the outer circumferential bridges $BD_{S2}$ and the center bridge $BD_{C2}$ occurs. Furthermore, in addition to a centrifugal force Fx4 occurring at the core portions 9d, the centrifugal forces Fx1, Fx2 and Fx3 also act on outer circumferential bridges $BD_{S4}$ and a center bridge $BD_{C4}$, and thus stress greater than that occurring at the outer circumferential bridges $BD_{S3}$ and the center bridge $BD_{C3}$ occurs.

In this way, since the stress is different depending on a position of each bridge BD in the radial direction, a width of each bridge BD preferably increases as it approaches the rotating shaft 8 or the q axis in the radial direction in order to maintain a mechanical strength at a certain fixed level as described above. However, in the case where the width of each bridge BD increases, magnetic saturation of each bridge BD is weakened, so that it remains easy for a magnetic flux flowing in from the stator 2 to flow through each bridge BD. Since the magnetic flux flowing through each bridge BD has a d-axial component, a d-axial magnetic flux that is needed to obstruct an original magnetic flux is increased. Thus, the saliency is reduced, and the motor performance is deteriorated. Accordingly, each bridge BD needs to be designed such that the magnetic saturation of each bridge BD is maximized (i.e., the width of each bridge BD is minimized) while maintaining a certain degree of mechanical strength.

Hereinafter, a suitable design method of each bridge BD will be described. The width of each bridge may be determined depending on a ratio of the width of each bridge to a reference width as a certain reference. To describe the ratio, a centrifugal force of each rotor core 9 separated by each flux barrier 11 will be described first with reference to FIG. 3.

Figure 3:
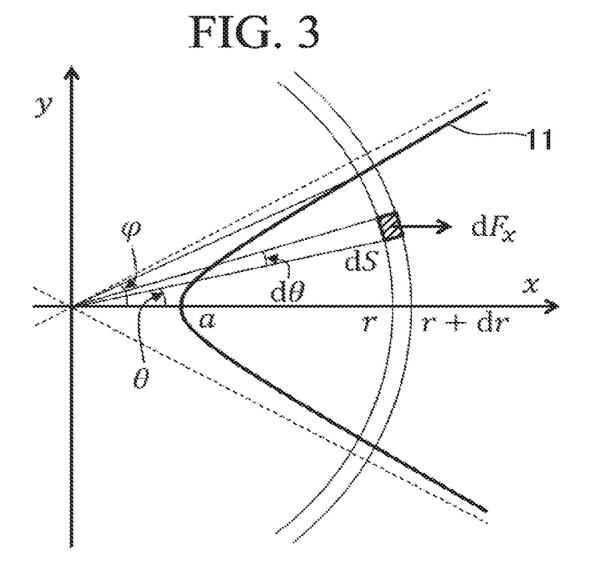
FIG. 3 is a schematic diagram showing each flux barrier modeled by a hyperbola.

FIG. 3 is a schematic diagram showing a flux barrier 11 modeled by the contour line of the hyperbola of Equation (1). In x-y coordinates (equivalent to r-θ coordinates) arbitrarily defined in a cross section of the rotor 3, attention is paid to a differential surface area dS. If the differential surface area dS rotates about the origin (the central axis O) at a rotational angular velocity ω, in a case where a density of the differential surface area dS is defined as ρ, an x-axial component dFx of a centrifugal force applied to the differential surface area dS can be expressed by Equation (2) below. In Equation (2), a indicates a shortest distance from the origin to the hyperbola. That is, a is an index used when a distance R from the central axis O to each flux barrier 11 is normalized according to an outer radius. The outer radius is a maximum distance (a radius Rmax) from the central axis O to an outer circumferential surface of the rotor core 9.

[Equation 2]

$$dF_x(a) = \rho r \omega^2 \cos\theta \cdot dS \qquad (2)$$
$$= \rho r \omega^2 \cos\theta \cdot (r \cdot dr \cdot d\theta)$$
$$= \rho r^2 \omega^2 \cos\theta \cdot dr \cdot d\theta$$

Therefore, if the x-axial component dFx expressed by Equation (2) is integrated, a centrifugal force Fx, which occurs at a portion surrounded by a hyperbola that represents each flux barrier 11 and a unit circle (i.e., an outer circumference of the rotor normalized by the radius Rmax), can be calculated. Equation (3) is a equation for deriving the centrifugal force Fx using the x-axial component dFx.

[Equation. 3]

$$F_x(a) = \int_a^1 \int_{-\varphi}^{\varphi} \rho r^2 \omega^2 \cos\theta \cdot dr \cdot d\theta \qquad (3)$$

Further, φ designating an interval of integration of Equation (3) from an intersection of a circle of a radius r and the hyperbola can be calculated as follows.

[Equation 4]

$$\varphi = \frac{2}{p} \cos^{-1}\left\{\left(\frac{a}{r}\right)^{\frac{p}{2}}\right\} \qquad (4)$$

When substituting into Equation (4) above, Equation (3) can be transformed as in Equation (5).

[Equation 5]

$$F_x(a) = 2\rho\omega^2 \int_a^1 r^2 \sin\left[\frac{2}{p}\cos^{-1}\left\{\left(\frac{a}{r}\right)^{\frac{p}{2}}\right\}\right] dr \qquad (5)$$

Figure 4:
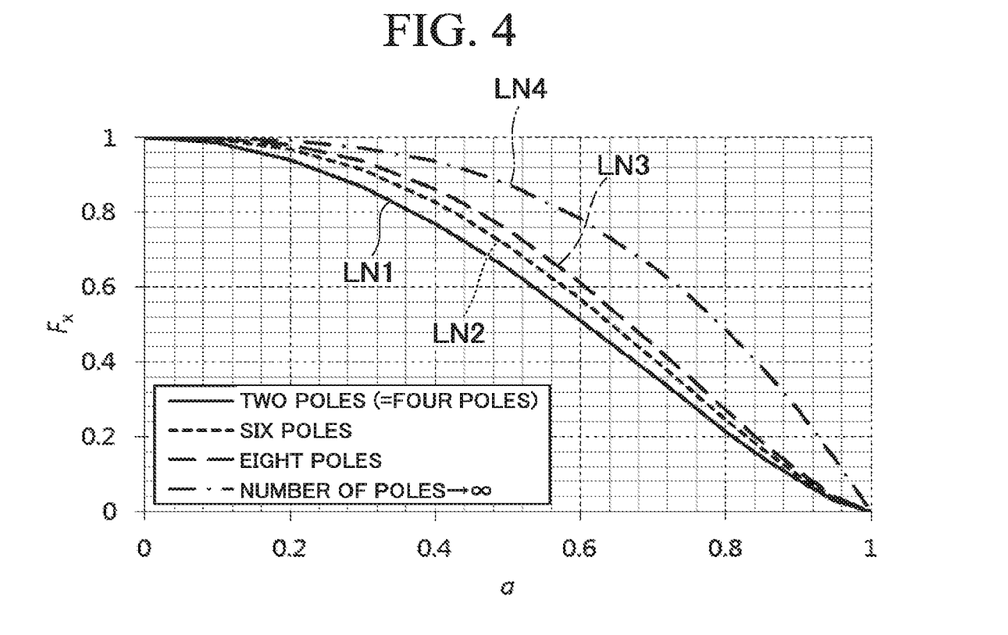
FIG. 4 is a diagram showing an example of a theoretical analysis result of the centrifugal force.

A calculated result of the definite integral using Equation (5) is shown in FIG. 4. FIG. 4 is a diagram showing an example of a result of theoretically calculating a centrifugal force using Equation (5). A centrifugal force in the case of two poles (p=2) or four poles (p=4) is expressed by a curve LN1, and a centrifugal force in the case of six poles (p=6) is expressed by a curve LN2. Further, a centrifugal force in the case of eight poles (p=8) is expressed by a curve LN3, and a centrifugal force in the case of an infinity (p=∞) where the number of poles is unlimited is expressed by a curve LN4. In FIG. 4, centrifugal forces Fx are normalized by a value of the centrifugal force Fx when a=0.

Figure 5:
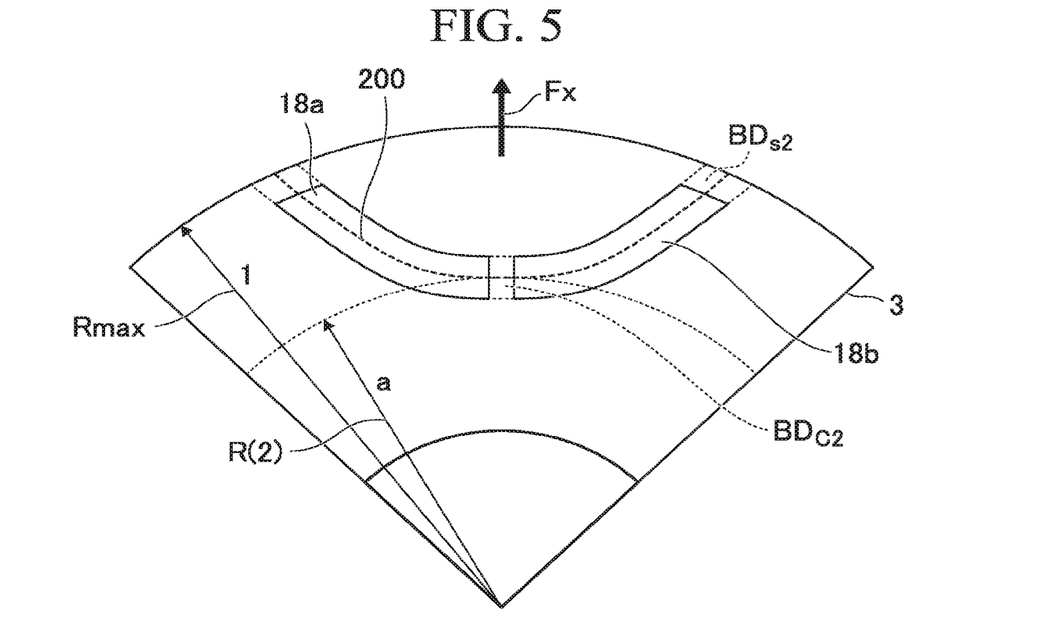
FIG. 5 is a diagram for showing a method of defining a position of each flux barrier.

The width of each bridge is determined using Equation (5) that represents the aforementioned centrifugal force Fx, as follows. FIG. 5 is a diagram for showing a method of defining a position of each flux barrier 11. In the example of FIG. 5, attention is paid to the flux barrier 11b, which is located between the other flux barriers 11 in the radial direction of the rotor 3, among the plurality of flux barriers 11. A value, which is normalized by dividing a radius R(2) of a circular arc whose center is the central axis O and which is tangent to a central line 200 of the flux barrier 11b by a radius Rmax of the outer circumferential surface of the rotor 3, is defined as the parameter a. The central line 200 is treated as a line that connects midpoints of segments indicating width directions of barrier regions 18a and 18b. For example, an arbitrary reference point is set on a curved line or a broken line that indicates an interface on an outer circumferential side. A straight line indicating a distance from the reference point to the curved line or the broken line that represents an interface close to the rotating shaft 8 which is the shortest becomes a segment that represents a width direction. Afterward, a plurality of segments for the interface close to the rotating shaft 8 are derived on the curved line or the broken line indicating the interface on the outer circumferential side while shifting the reference point. A curved line that passes through the midpoints of the plurality of segments derived in this way becomes the central line 200. In a case where the rotor 3 having the constitution as illustrated in FIG. 5 is rotated, stresses occurring at the outer circumferential bridges $BD_{S2}$ and the center bridge $BD_{C2}$ that are located around the flux barrier 11b are approximately proportional to a value obtained when the centrifugal force Fx calculated by Equation (5) is divided by the width of each bridge.

Figure 6:
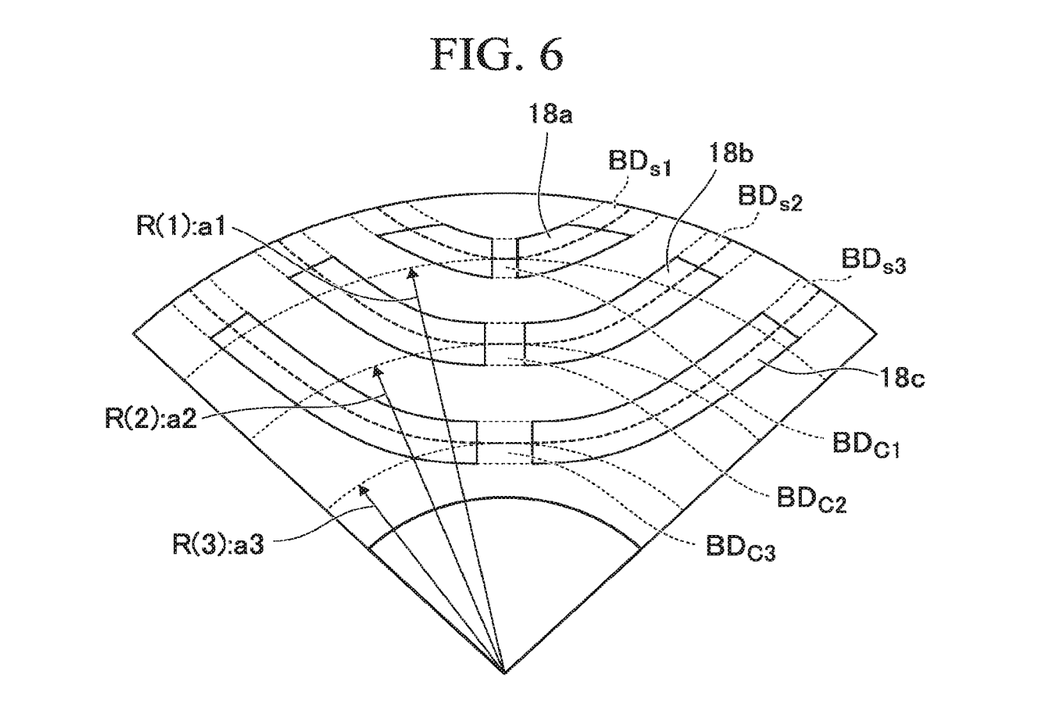
FIG. 6 is a diagram showing a distance from a central axis to each flux barrier.

FIG. 6 is a diagram showing a distance from a central axis O to each flux barrier 11. Since the stress occurring at each bridge approximates to a value obtained when a centrifugal force Fx is divided by a width of the corresponding bridge, in a case where normalized distances to the flux barriers 11 (the barrier regions 18) as in FIG. 6 are defined as a1, a2 and a3, if widths of the outer circumferential bridges $BD_S$ located around them are changed according to a ratio of Fx(a1):Fx(a2):Fx(a3), stresses occurring thereat becomes nearly uniform. Fx(a1) is a centrifugal force at a position of the flux barrier 11a, and Fx(a2) is a centrifugal force at a position of the flux barrier 11b. Further, Fx(a3) is a centrifugal force at a position of the flux barrier 11c. When the widths of the bridges are determined in this way, the stress occurring can thereby be subjected to critical design such that it becomes within a specified value restricted in view of a mechanical strength.

To be more specific, each bridge width may be determined according to the following procedure. First, a position of a reference flux barrier 11 is arbitrarily determined in the rotor core 9. The reference flux barrier 11 is, for example, a flux barrier 11 that is formed at a position closest to the central axis O (the rotating shaft 8) in the radial direction of the rotor core 9 among a plurality of flux barriers 11 formed in the rotor core 9. Determining positions of each flux barrier 11 is to determine a distance from the central axis O to each flux barrier 11. This position may be determined in view of a magnetic circuit. In the case of the present embodiment, the reference flux barrier 11 is the flux barrier 11c, and a normalized reference distance from the central axis O (a value obtained by dividing a distance from the central axis O to the reference flux barrier 11 by an outer radius of the rotor core 9) is a3. A centrifugal force Fx(a3) is calculated from the distance a3. Next, widths of the outer circumferential bridges $BD_{S3}$ and the center bridge $BD_{C3}$ that belong to the flux barrier 11c that becomes the reference flux barrier 11 are temporarily determined. Hereinafter, the temporarily determined widths of the bridges are referred to as reference widths. In the present embodiment, the reference width of each outer circumferential bridge $BD_{S3}$ is $w_{O3}$, and the reference width of the center bridges $BD_{C3}$ is $w_{C3}$. Next, a position of the flux barrier 11b formed on the outer circumferential side of the flux barrier 11c is arbitrarily determined. That is, the distance a2 from the central axis O to the flux barrier 11b is determined. However, a3 is shorter than a2. A width $w_{O2}$ of each outer circumferential bridge $BD_{S2}$ belonging to the flux barrier 11b and a width $w_{C2}$ of the center bridge $BD_{C2}$ belonging to the flux barrier 11b are calculated from a ratio between the centrifugal force Fx(a2) and the centrifugal force Fx(a3) using the following equations.

$$w_{O2}=w_{O3} \times Fx(a2)/Fx(a3)$$

$$w_{C2}=w_{C3} \times Fx(a2)/Fx(a3)$$

Similarly to above, a width $w_{O1}$ of each outer circumferential bridge $BD_{S1}$ belonging to the flux barrier 11a formed on a farther outer circumferential side than the flux barrier 11b and a width $w_{C1}$ of the center bridges $BD_{C1}$ belonging to the flux barrier 11a are calculated from a ratio between the centrifugal force Fx(a1) and the centrifugal force Fx(a3) by the following equations.

$$w_{O1}=w_{O3} \times Fx(a1)/Fx(a3)$$

$$w_{C1}=w_{C3} \times Fx(a1)/Fx(a3)$$

By performing determination in this way, a relationship such as $w_{O1}:w_{O2}:w_{O3}=Fx(a1):Fx(a2):Fx(a3)$ is satisfied, and the stress of each portion is made uniform. Thus, a mechanical strength can be improved. In a case where the stress of each bridge exceeds the specified value, the initially temporarily determined width (i.e., the reference width) of the bridge belonging to the flux barrier 11 closest to the rotating shaft 8 need only be widened. As described above, a greatest centrifugal force is applied to the bridge belonging to the flux barrier formed at the position closest to the central axis O (the rotating shaft 8), and a necessary bridge width also becomes widest. That is, this bridge becomes a portion having a greatest influence in terms of the mechanical strength and the magnetic circuit. Accordingly, as described above, the flux barrier closest to the central axis O is selected as the reference flux barrier, and the width of the bridge belonging to this flux barrier is set to a reference width, so that an optimal shape can be determined. However, it is thought that, in view of a structure or for reasons other than that, the width of the bridge belonging to the flux barrier closest to the central axis O cannot be sometimes arbitrarily selected, and there is no choice but to take a bridge width having a considerable allowance as the mechanical strength in some cases. In this case, when the flux barrier closest to the central axis O is set as a reference, the other bridges are also designed to have an unnecessary allowance as the mechanical strength, so that the motor performance is reduced. In this case, without being limited to the flux barrier closest to the central axis O, the other flux barriers are preferably selected as the references. Even in a case where the reference flux barrier is changed, a design for an optimal bridge width is realized in the same procedure as above. In the present embodiment, the case where the flux barriers 11 are three layers has been described, but a case where the number of layers of the flux barriers is one or two, or four or more may also be determined in a similar procedure.

Figure 7:
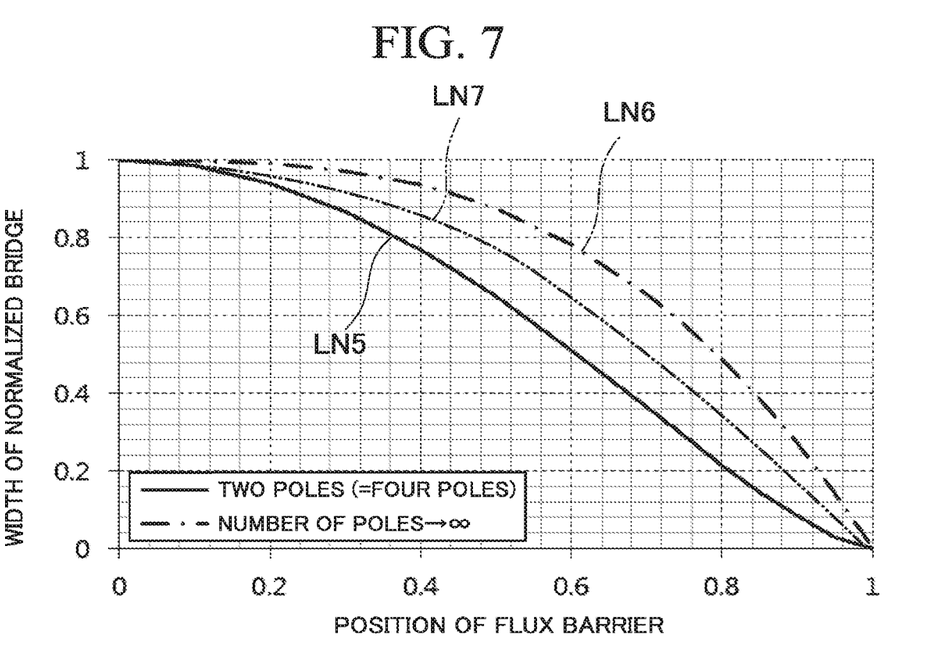
FIG. 7 is a diagram showing a relationship between a position of each flux barrier and a width of each bridge.

Since Equation (5) is a function of the number of poles p, the value of the centrifugal force Fx(a) differs in a rotor 3 having the different number of poles. A curve LN5 of FIG. 7 represents a trend in a change in the width of the bridge required to maintain a fixed mechanical strength with respect to stress that is approximately proportional to a centrifugal force Fx occurring in the case of the two poles (p=2) or the four poles (p=4). Likewise, a curve LN6 represents a trend in a change in the width of the bridge required to maintain a fixed mechanical strength with respect to stress that is approximately proportional to a centrifugal force Fx occurring in the case of the infinity (p=∞) where the number of poles is unlimited.

Therefore, regardless of the number of poles p, a ratio between the width of each outer circumferential bridge $BD_S$ and the width of the center bridge $BD_C$ need only be practically determined to fall within a region surrounded by the aforementioned curves LN5 and LN6. The width of all the bridges need not fall within this region. When the width ($w_{O1}$ or $w_{c1}$ in the present embodiment) of the bridge belonging to the flux barrier 11 (the flux barrier 11a or the like in the present embodiment) located closer to the outer circumference is intended to fall within the above region, this width may be narrowed to such a degree that manufacturing is difficult in view of mechanical working. In general, a shape of the rotor core 9 is realized by punching or laser cutting. Accordingly, the width of each bridge may be limited from restriction of the mechanical working. In this case, the width of each bridge is set to a realizable smallest width under a restriction such as working accuracy, so that a reduction in the motor performance can be minimized.

The curves LN5 and LN6 can be derived as follows. If the number of poles p satisfies p=2 in Equation (5) above, the centrifugal force Fx can be calculated as Equation (6).

[Equation 6]

$$F_x(a) = \frac{2\rho\omega^2}{3}(1-a^2)^{\frac{3}{2}} \tag{6}$$

Further, if the number of poles p satisfies p=∞, the centrifugal force Fx can be calculated as Equation (7).

[Equation 7]

$$F_x(a) = \frac{2\pi\rho\omega^2}{3p}(1-a^3) \tag{7}$$

The curve LN5 can be obtained as $f(a)=(1-a^2)^{3/2}$ by normalizing Equation (6). Further, the curve LN6 can be obtained as $g(a)=(1-a^3)$ by normalizing Equation (7). That is, a ratio between the width of each outer circumferential bridge $BD_S$ and the width of the center bridge $BD_C$ need only fall between $(1-a^2)^{3/2}$ and $(1-a^3)$. That is, the flux barrier 11 formed at the position closest to the central axis O (the rotating shaft 8) is set as a reference flux barrier, the normalized distance from the central axis O is defined as a reference distance a, the width of each outer circumferential bridge $BD_S$ belonging to the flux barrier is defined as $w_{Oa}$, the width of the center bridge $BD_C$ is defined as $w_{Ca}$. Next, when normalized distances of the flux barriers 11 other than the reference flux barrier is set to b(>a), a width $w_{Ob}$ of each outer circumferential bridge $BD_S$ belonging to the flux barrier and a width $w_{Cb}$ of the center bridge $BD_C$ need only be determined to satisfy the following relationships.

$$f(b)/f(a) \leq w_{Ob}/w_{Oa} \leq g(b)/g(a)$$

$$f(b)/f(a) \leq w_{Cb}/w_{Ca} \leq g(b)/g(a)$$

Thus, a quantity of leakage magnetic flux in the direction of the d axis can be minimized while maintaining a mechanical strength of the rotor 3 as a whole by making the stress occurring at each bridge BD uniform. As a practical operation, the widths of each outer circumferential bridge $BD_S$ and the center bridge $BD_C$ in relation to each reference width may be determined to coincide with the curve LN7 that connects a midpoint between a width represented by the curve LN5 and a width represented by the curve LN6 at each position a.

According to the first embodiment described above, since the width of each outer circumferential bridge $BD_S$ and the width of the center bridge $BD_C$ are determined to be proportional to the centrifugal force Fx occurring at the position of each flux barrier 11, the stress occurring at each bridge can be made uniform. As a result, the motor performance can be improved while maintaining the mechanical strength.

In the aforementioned first embodiment, the case where each flux barrier 11 has only the center bridge $BD_C$ may also similarly determine a ratio of the width of the center bridge $BD_C$ to the reference width within a range between $(1-a^2)^{3/2}$ and $(1-a^3)$. Further, in the case where each flux barrier 11 has both of each outer circumferential bridge $BD_S$ and the center bridge $BD_C$, only a ratio of either of the widths to the reference width may be determined within the range the between $(1-a^2)^{3/2}$ and $(1-a^3)$.

Second Embodiment

Figure 8:
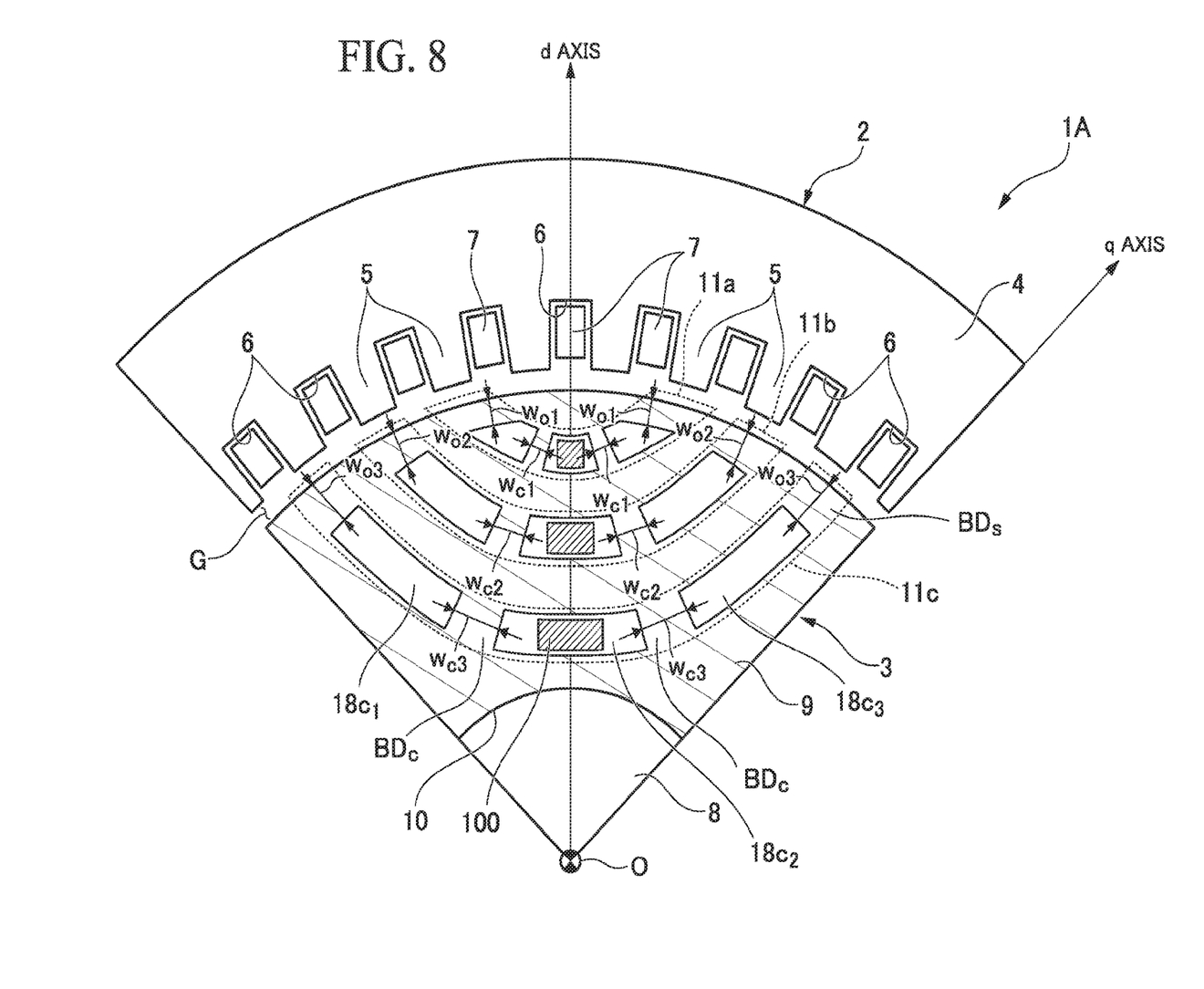
FIG. 8 is a sectional view that shows a constitution equivalent to one pole of a reluctance motor in a second embodiment and that is orthogonal to a rotating shaft.

Hereinafter, a reluctance motor 1A in a second embodiment will be described. Here, as a difference of the second embodiment from the first embodiment, the point that two center bridges $BD_C$ are formed and three barrier regions 18 are formed at each of flux barriers 11a, 11b and 11c will be described. Hereinafter, functions or the like that are the same as in the aforementioned first embodiment will not be described.

FIG. 8 is a sectional view that shows a constitution equivalent to one pole of a reluctance motor 1A in a second embodiment and that is orthogonal to a rotating shaft 8. Further, FIG. 9 is a diagram showing a relationship of a distance from a central axis O to each flux barrier 11.

Figure 9:
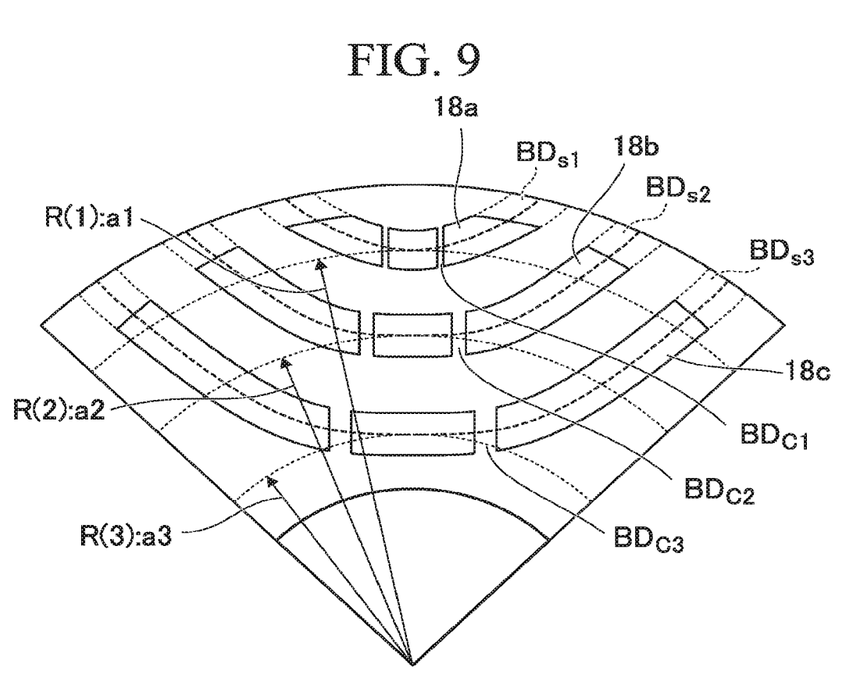
FIG. 9 is a diagram showing a distance from a central axis to each flux barrier.

As illustrated in FIGS. 8 and 9, in the second embodiment, a position of the flux barrier 11a closest to an outer circumferential side is defined as a1, a position of the flux barrier 11c closest to a central axis O is defined as a2, and a position of the flux barrier 11b between the flux barrier 11a and the flux barrier 11c is defined as a3. With regard to a1, a2 and a3, a width of each outer circumferential bridge $BD_S$ and a width of each center bridge $BD_C$ in relation to a reference width are determined to be within the aforementioned range between $(1-a^2)^{3/2}$ and $(1-a^3)$, so that a leakage magnetic flux flowing through each bridge can be reduced while maintaining a mechanical strength. In FIG. 8, a reference sign of 8c indicating a barrier region is given to only the flux barrier 11c closest to the central axis O, but this applies equally to the other flux barriers 11a and 11b.

Further, the separated barrier regions in an arbitrary flux barrier 11x are expressed as $18x_1$, $18x_2$ and $18x_3$. x is any of a, b and c.

In the second embodiment, a permanent magnet 100 is inserted into at least one of a plurality of barrier regions 18 (into a barrier region $18a_2$, $18b_2$ or $18c_2$ sandwiched between the two center bridges $BD_C$ in the illustrated example). The permanent magnet 100 in the present embodiment is a magnet rather than an electromagnet, and refers to an object that can continue to generate an almost constant magnetic field in a case where an age of service (a lifespan) of the reluctance motor 1A is considered. Each permanent magnet 100 is, for example, a neodyminum magnet, a ferrite magnet, a samarium iron cobalt magnet, or the like. The permanent magnets 100 inserted into the barrier regions 18 may be magnetized nearly in the direction of a d axis after being inserted, and the permanent magnet 100 magnetized in a predetermined direction in advance may be inserted such that a magnetizing direction thereof is directed nearly in the direction of the d axis. That is, the permanent magnet 100 need only be magnetized to form a magnetic circuit along with a rotor core 9 that is located on an outer circumferential side with respect to the barrier region 18 to be inserted, bridges between which the barrier region 18 is sandwiched, and another rotor core 9 that is located close to a rotating shaft 8 with respect to the barrier region 18 to be inserted. In other words, the magnetizing direction of the permanent magnet 100 is directed in a direction that intersects a longitudinal direction of each flux barrier 11 at a position at which the permanent magnet is provided. To fix the inserted permanent magnet 100, each barrier region 18 may be filled with a non-magnetic material such as an adhesive resin, and a spacer or the like of the non-magnetic material may be inserted into each barrier region 18 along with each permanent magnet 100. The non-magnetic material has a lower permeability than the rotor core 9. Like the aforementioned embodiment, a conductor such as aluminum or copper may be inserted into each barrier region 18 instead of each permanent magnet 100.

Further, each permanent magnet 100 may be disposed to be separated from at least part (preferably the entirety) of a surface that forms at least a contour of each barrier region 18 in a cross section of the rotor 3. That is, each permanent magnet 100 is disposed inside each barrier region 18 so as not to be in direct contact with the rotor core 9. Due to this disposition, local irreversible demagnetization occurring at a corner or the like of each permanent magnet 100 can be suppressed.

The permanent magnet 100 inserted into the barrier region 18 has a magnetomotive force that is not such as to interfere with driving of the reluctance motor 1A. A magnetic flux produced by the magnetomotive force of the permanent magnet 100 is divided into a magnetic flux that is directed nearly in the direction of the d axis which is a magnetizing direction, a magnetic flux that goes through the outer circumferential bridges $BD_S$, and a magnetic flux that goes through the center bridges $BD_C$. Since the outer circumferential bridges $BD_S$ and the center bridges $BD_C$ are cores, there are saturated magnetic flux densities corresponding to their materials. Accordingly, when a magnetic flux flows to the outer circumferential bridges $BD_S$ and the center bridges $BD_C$ beyond the saturated magnetic flux densities of the cores, a magnetic resistance of each bridge increases, and the magnetic flux flows hardly. Since the magnetic flux generated from each permanent magnet 100 flows through each bridge nearly in a direction opposite to the direction of the d axis, a magnetic flux flowing in from the vicinity of the stator 2 hardly flows to each bridge nearly in the direction of the d axis. Each bridge BD where a magnetic flux is saturated becomes the flux barrier 11 in a wide sense because it is impervious to a more magnetic flux than the saturated magnetic flux. Due to the effect of the permanent magnet 100, a quantity of the magnetic flux flowing in the direction of the d axis among a quantity of the magnetic flux flowing in from the stator 2 is reduced, and thereby a quantity of a magnetic flux flowing in a direction of a q axis can be increased. Thus, saliency can be improved compared to that of the reluctance motor 1 in which the permanent magnets 100 are not provided on the barrier regions 18.

Figure 10:
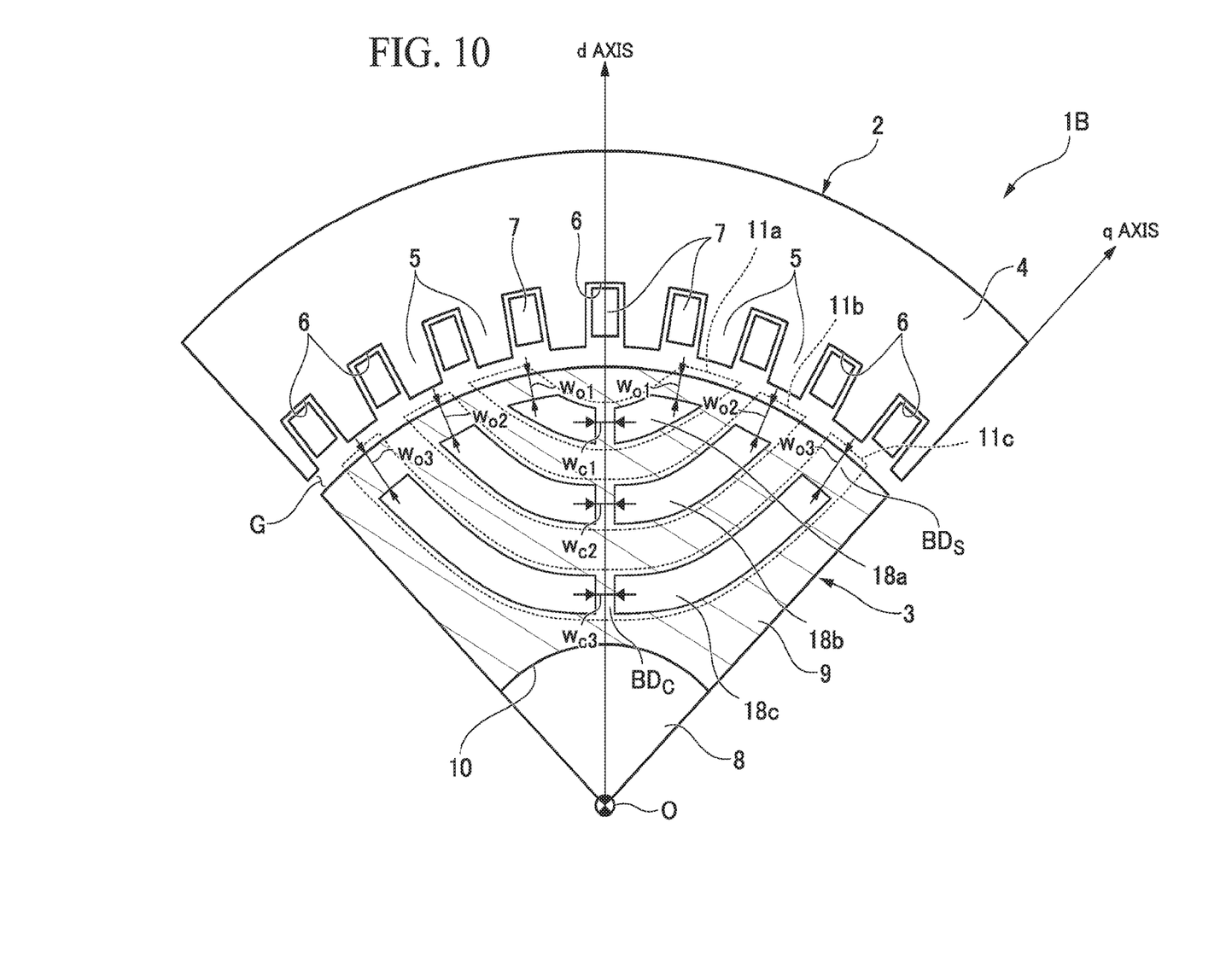
FIG. 10 is a sectional view that shows a constitution equivalent to one pole of a reluctance motor in which a ratio between widths of center bridges is not proportional to a centrifugal force and that is orthogonal to a rotating shaft.
Figure 11:
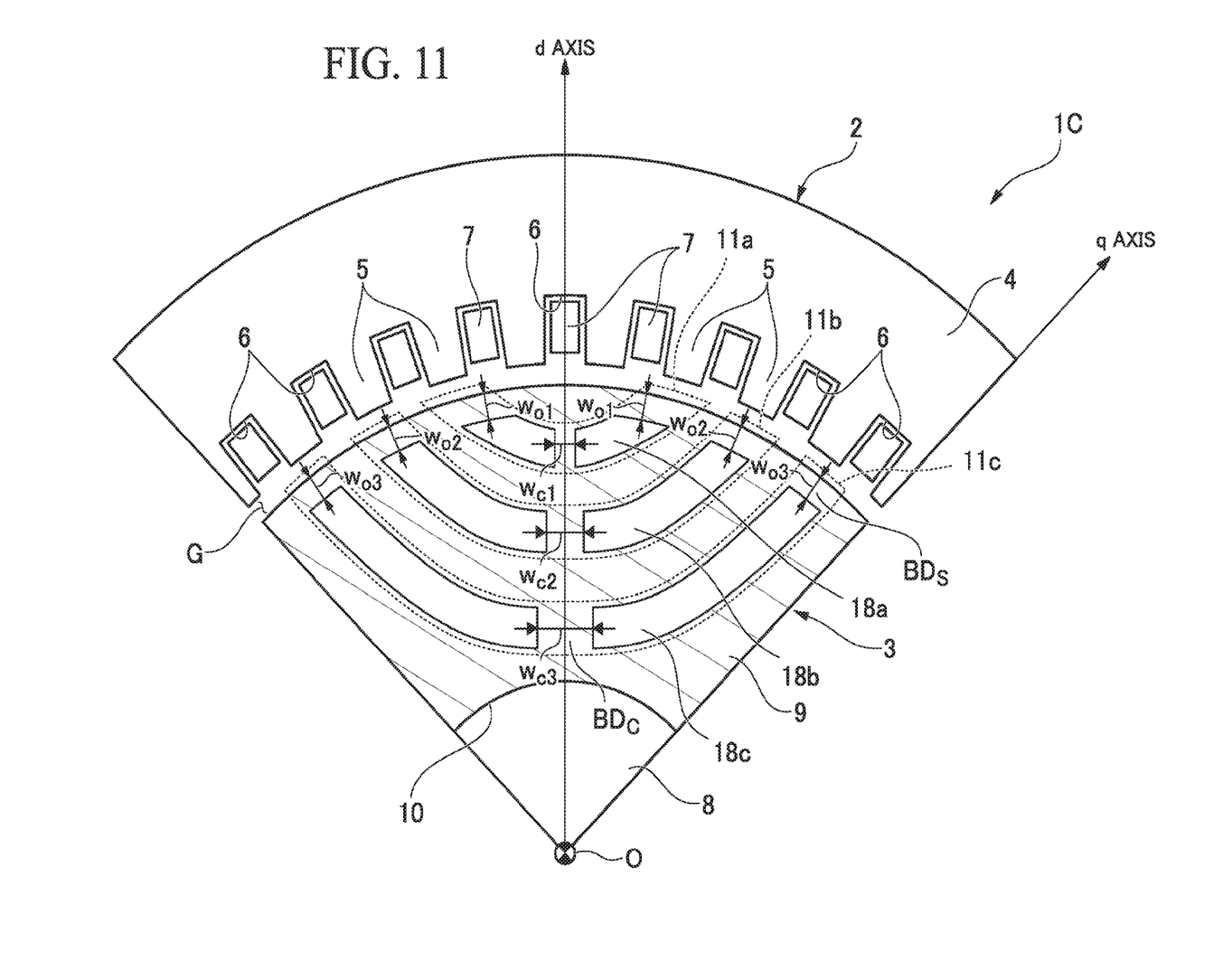
FIG. 11 is a sectional view that shows a constitution equivalent to one pole of a reluctance motor in which a ratio between widths of outer circumferential bridges is not proportional to a centrifugal force and that is orthogonal to a rotating shaft.

Further, either of a ratio of the widths of the outer circumferential bridges $BD_S$ or a ratio of the widths of the center bridges $BD_C$ may not fall between $(1-a^2)^{3/2}$ and $(1-a^3)$. FIG. 10 is a sectional view that shows a constitution equivalent to one pole of the reluctance motor 1B in which the ratio between widths of center bridges $BD_C$ is not proportional to the centrifugal force Fx and that is orthogonal to the rotating shaft 8. Further, FIG. 11 is a sectional view that shows a constitution equivalent to one pole of a reluctance motor 1C in which a ratio between widths of outer circumferential bridges $BD_S$ is not proportional to a centrifugal force Fx and that is orthogonal to a rotating shaft 8. In this way, if the reluctance motor 1 is configured such that at least one of the ratios of the widths of the bridges is proportional to the centrifugal force Fx, the quantity of the magnetic flux flowing in the direction of the d axis among the quantity of the magnetic flux flowing in from the stator 2 can be reduced.

According to the second embodiment described above, after the width of each outer circumferential bridge $BD_S$ and the width of each center bridge $BD_C$ are determined to be proportional to the centrifugal force Fx occurring at the position of each flux barrier 11, the permanent magnet 100 is inserted into the barrier region 18. Thus, a quantity of leakage magnetic flux flowing in the direction of the d axis can be further reduced. As a result, the motor performance can be further improved.

According to at least one embodiment described above, since the width of each outer circumferential bridge $BD_S$ and the width of each center bridge $BD_C$ are determined to be proportional to the centrifugal force Fx occurring at the position of each flux barrier 11, the stress occurring at each bridge can be made uniform. As a result, the motor performance can be improved while maintaining the mechanical strength.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotor comprising:
    a shaft configured to rotate about the central axis; and
    a rotor core fixed to the shaft, wherein
    the rotor core has a plurality of flux barriers formed side by side in a radial direction of the rotor core, each of the flux barriers ranging from a certain portion to another portion of an outer circumferential surface of the rotor core,
    each of the flux barriers has:
        a plurality of bridges; and
        one or more barrier regions that have a lower permeability than a portion other than each of the flux barriers in the rotor core between the plurality of bridges, and
    when
        an arithmetic mean value between a minimum and a maximum of a width of a first flux barrier of the flux barriers, which is close to the central axis, is defined as $w_a$,
        an arithmetic mean value between a minimum and a maximum of a width of a second flux barrier of the flux barriers, which is distant from the central axis, is defined as $w_b$,
        a value obtained by dividing a radius of a smallest circle whose center is the central axis and which is tangent to a central line of the first flux barrier by an outer radius of the rotor core is defined as a, and
        a value obtained by dividing a radius of a smallest circle whose center is the central axis and which is tangent to a central line of the second flux barrier by the outer radius of the rotor core is defined as b,
        $f(x)=(1-x^2)^{(3/2)}$, and
        $g(x)=(1-x^3)$,
    a relationship of $f(b)/f(a) \le w_b/w_a \le g(b)/g(a)$ is satisfied.

2. The rotor according to claim 1, wherein, among the plurality of flux barriers provided in the rotor core, a flux barrier of the flux barriers closest to the central axis is used as the first flux barrier.

3. The rotor according to claim 1, wherein one or more magnetic paths, which are separated by the flux barriers and through which magnetic flux produced by a stator passes, are formed in the rotor core.

4. The rotor according to claim 1, wherein:
    the bridges have:
        outer circumferential bridges that are formed at opposite ends of the respective flux barrier in a longitudinal direction of the respective flux barrier to form part of the outer circumferential surface of the rotor core; and
        one or more inner bridges that are formed between the outer circumferential bridges, and
    the relationship is satisfied in relation to the outer circumferential bridges, in relation to the inner bridges, or in relation to the outer circumferential bridges and the inner bridges.

5. A reluctance motor comprising:
    the rotor defined in claim 1;
    a stator core disposed on an outer circumference of the rotor core at an interval from the rotor core and having a plurality of teeth arranged with a space between each other in a circumferential direction; and
    multipole multiphase armature windings wound around the plurality of teeth.

* * * * *